July 21, 1964    H. L. DEVEREAUX, JR    3,141,727
FILM-STRIP DENSITY CURVE PLOTTING DEVICE
Filed Dec. 14, 1962    3 Sheets-Sheet 1

INVENTOR.
HARRY L. DEVEREAUX, JR.
BY
P. H. Firsht
ATTORNEY.

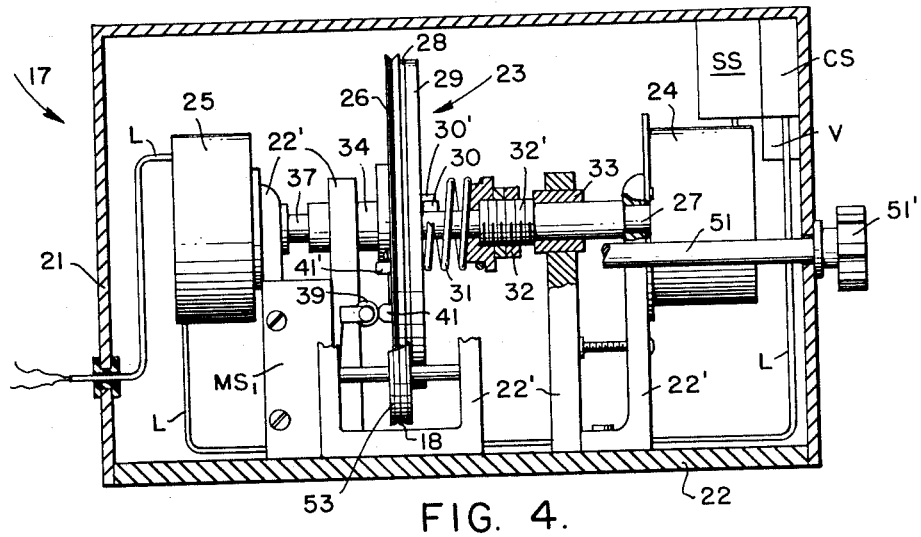
FIG. 4.
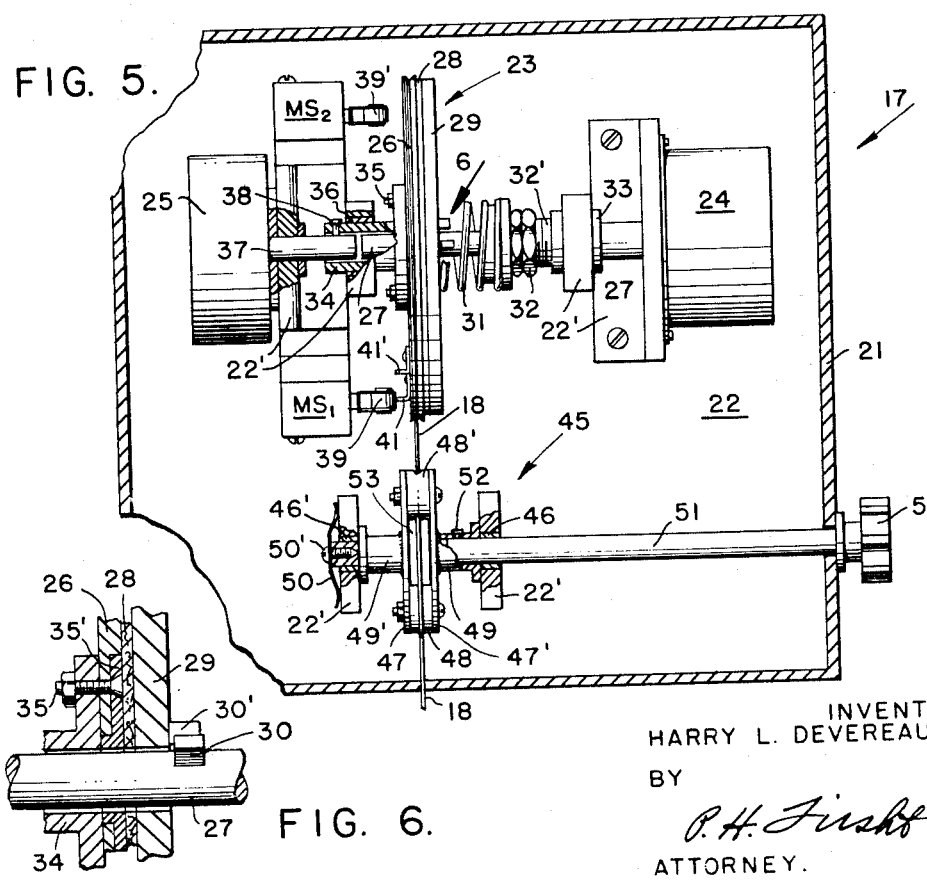
FIG. 5.
FIG. 6.
INVENTOR.
HARRY L. DEVEREAUX, JR.
BY
*P. H. Fiske*
ATTORNEY.

INVENTOR.
HARRY L. DEVEREAUX, JR.
BY
P. H. Firsht
ATTORNEY.

United States Patent Office 3,141,727
Patented July 21, 1964

3,141,727
FILM-STRIP DENSITY CURVE PLOTTING DEVICE
Harry L. Devereaux, Jr., China Lake, Calif., assignor to the United States of America as represented by the Secretary of the Navy
Filed Dec. 14, 1962, Ser. No. 244,841
11 Claims. (Cl. 346—29)
(Granted under Title 35, U.S. Code (1952), sec. 266)

The invention described herein may be manufactured and used by or for the Government of the United States of America for governmental purposes without the payment of any royalties thereon or therefor.

The present invention relates to an apparatus for plotting density curves for stepped research and control film strips, hereinafter referred to as film-strips, and more particularly to a film-strip feeding and plotting pen control device which feeds a film-strip through a photoelectric densitometer and controls a plotting of a film-strip and a film-strip's density.

At present, the vast majority of film processing facilities utilize manual photoelectric densitometers for obtaining film-strip density curves. These devices require that a given film-strip be drawn by hand, step by step, therethrough and a meter reading, or density value, for each film-strip be taken and individually recorded. The recorded values, representing the densities of the various film-strip steps are then plotted on a graph and a final density curve obtained through connecting the plotted points in a conventional manual fashion.

While density curves may be obtained through the use of complex and expensive automatic plotting densitometers and microdensitometers, complexity and costs of these devices severely limit their utilization and render them impractical for routine film processing operations. On the other hand, the use of manual photoelectric densitometers, as utilized by the majority of laboratories, is time consuming, tedious, and subject to errors introduced through meter reading and manual plotting of the density values derived from the film-strip through the densitometer. Therefore, the purpose of the present invention is to provide a film-strip drive unit for heretofore manual photoelectric densitometers to automate film-strip density curve plotting processes while providing for an error free, film-strip density curve.

An object of the present invention is to provide a film-strip drive unit for a manual photoelectric densitometer which will increase the number of film-strips that can be read by a single densitometer in a given period of time.

Another object is to provide a film-strip drive unit for use with manual densitometers, which drive unit is simple, efficient and readily operable.

Still another object is to provide an inexpensive, portable unit for the purposes of automating manual photoelectric densitometers.

A further object is to provide a mechanism for feeding a film-strip, obtaining film-strip density values, and plotting density curves in accordance with the film-strip density.

A still further object is to provide a portable film-strip drive unit which is readily assembled in combination with a plurality of known devices to effect a unique film-strip density plotting combination.

These and other objects and advantages of the invention will be more fully set forth in the following specification and claims when considered in connection with the accompanying drawings wherein:

FIG. 4 is a fragmentary front elevation of the film-strip drive unit;

FIG. 5 is a plan view of the film-strip drive unit;

FIG. 6 is a fragmentary plan view, on an enlarged scale, taken generally at 6, FIG. 5, but with certain elements thereof being slightly rotated;

Figure 1:
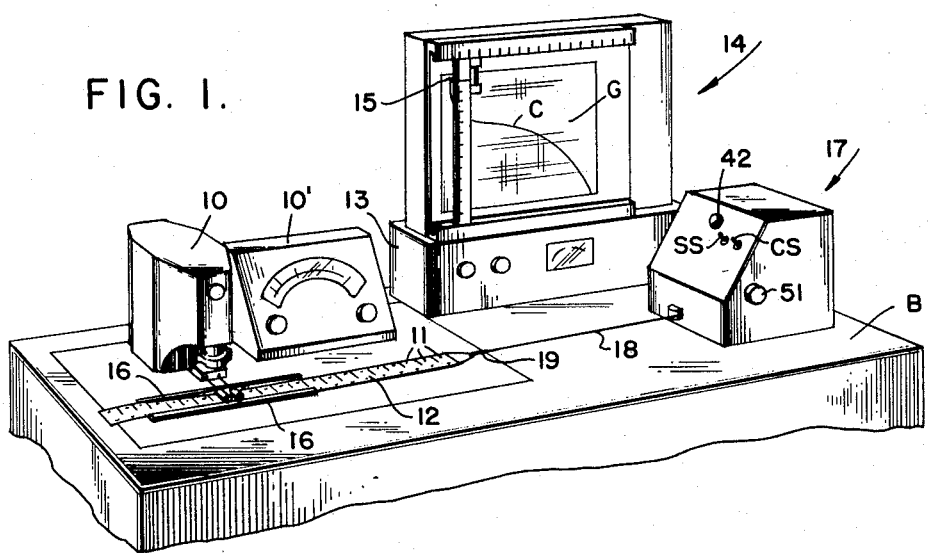
FIG. 1 is a perspective view of the present invention, including a film-strip drive unit.

Referring now more specifically to the drawings, wherein like reference characters designate like or corresponding parts throughout the several views, there is shown in FIG. 1 a base B having mounted thereon a photoelectric densitometer, generally designated by the reference numeral 10, of the type which is ordinarily provided wtih a logarithmically responsive meter 10'. The densitometer and meter are of known design and construction, therefore, a specific description thereof is not deemed necessary, since a known unit such as, for example, a Westrex 1100B manual densitometer, may be utilized in the instant invention to determine and indicate a density value for each successive step 11 of a film-strip 12, more clearly shown in FIG. 2, which values are then plotted for purposes well known in the film processing field. The meter 10' may be eliminated where visual detection of the film-strip density values is not required.

Film-strip density information is provided as an electrical output signal from the densitometer 10 and is directed to a logarithmic converter unit, generally designated by reference numeral 13, which is mounted on the base B in any desirable manner adjacent the densitometer 10. The converter unit 13 is also of well known design, for example, the Mosley Model 60B logarithmic converter may be utilized, therefore, a detailed description of the logarithmic converter unit 13 is not deemed necessary, and it suffices to understand that the logarithmic converter unit 13 utilizes an input signal from the densitometer 10 to provide output density intelligence in the form of D.C. (direct current) signals proportional to, and indicative of, the optical density of each step 11 of a film-strip 12.

Figure 3:
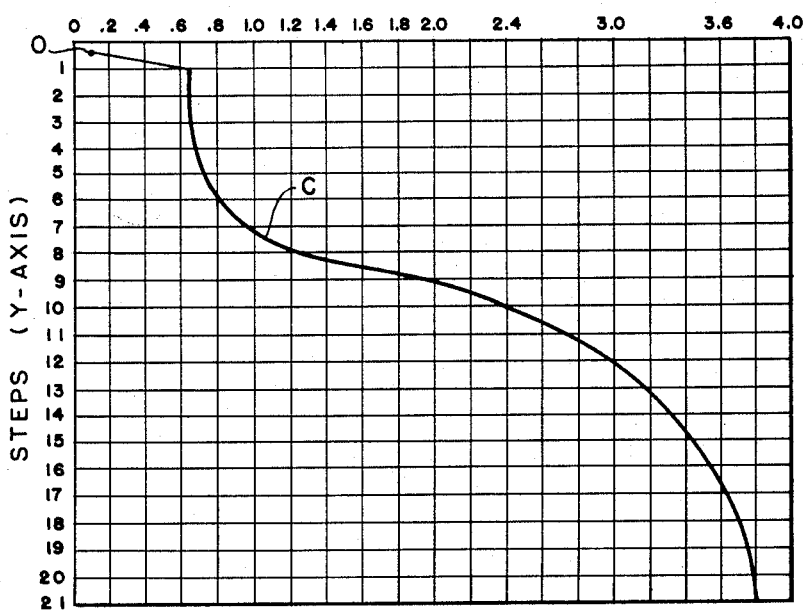
FIG. 3 is a diagrammatic view illustrating a graph and plotted film-strip density curve.
Figure 8:
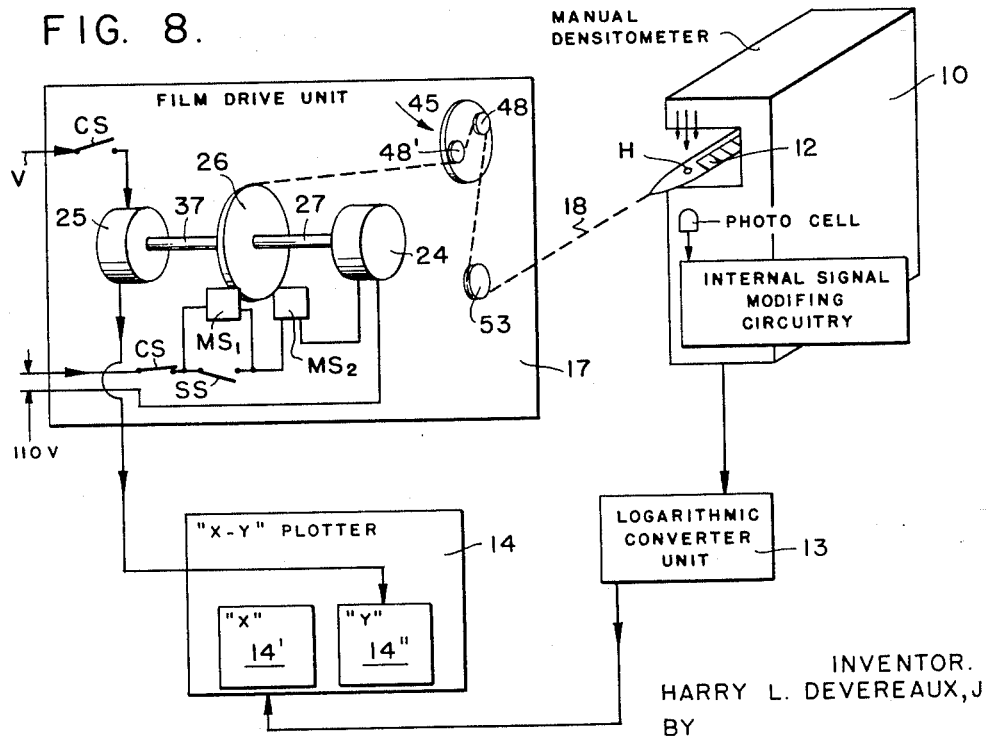
FIG. 8 is a diagrammatic view illustrating an operative relationship for the components shown in FIG. 1.

The output film-strip density intelligence is fed from the converter unit 13 into an X—Y plotter unit, generally designated by the reference numeral 14, having a pen drive means 14' and 14", as diagrammatically illustrated in FIG. 8, disposed therein for driving a plotting pen 15 along both and "X" and "Y" axis of a graph G, FIG. 3, arranged so as to have a film-strip density curve C plotted thereon. It is to be particularly noted that where a densitometer output signal does not require a conversion before input into the plotting unit 14, the converter unit 13 may be eliminated.

The graph G, as shown in FIG. 3, is provided with graduations extending along both its "X" and "Y" axes. The graduations which extend from left to right along the "X" axis are for recording density values within a range of 0 to 4.0. The graduations, which extend from top to bottom along the "Y" axis correspond to the twenty-one steps, ordinarily provided for each film-strip 12, at which separate density film-strip values are taken. Therefore, a density curve C may be plotted on the graph G by determining individual values for each step 11 and then imparting movement to the pen 15 of the plotter unit 14 in accordance therewith, and in a manner as will hereinafter be more fully described.

The aforementioned X—Y plotter unit 14 is, likewise, of well known design and construction, therefore, a detailed description thereof is omitted in the interest of brevity. However, it is to be noted that a portable unit, known as the Mosley Model 135 X—Y plotter, has been utilized quite satisfactorily for obtaining a film-strip density curve plot of an aforementioned film-strip 12.

The film-strip 12 is drawn in a continuous fashion through the densitometer 10 along a guide track 16 provided for guiding the film-strip as it is drawn by a film drive unit, generally designated 17, FIG. 1, having a flexible draw line 18 secured to the film-strip by any suitable means, such as a clip 19, attached to the draw line. As each of the separate steps 11 of the film-strip 12 is drawn through the densitometer 10, the plotting pen 15 is caused to move in a corresponding fashion along the "X" axis, and simultaneously therewith, along the "Y" axis of the graph G so as to provide an intensity value point plot for each step 11 in a manner as will hereinafter become more clearly understood.

Turning now to FIGS. 4 and 5, the film-strip drive unit 17 comprises a housing 21 which, as shown, is designed as a portable housing, although where found desirable the unit may be permanently secured to, or formed as an integral part of, the base B and be arranged above or below the level of the guide track 16 in any suitable manner which permits the aforementioned draw line 18 to be drawn along such a path as is necessary for drawing the film-strip 12 along the guide track 16 through the densitometer 10. Within the housing 21 there is arranged a base 22 serving as a mounting for a plurality of members 22', which support and maintain the structural components of the unit, including a take-up reel assembly 23, a low r.p.m. (revolutions per minute) drive motor 24, and a linear single turn potentiometer 25.

The reel assembly 23 is provided with a grooved disc, or sheave 26, to which one end of the draw line 18 is secured and about which the draw line is wound as the sheave 26 is caused to rotate through a power or drive train, not designated, by the drive motor 24. The drive motor 24 is coupled within the drive train to the sheave 26 through a drive shaft 27 and a friction or slip-clutch arrangement comprising a friction surface, formed as a felt layer 28, secured to one face of a rotatable clutch plate 29, which is loosely mounted for limited displacement on the shaft 27. The clutch plate 29 is operatively connected with the shaft 27 in any suitable manner, for example, a drive dog 30 may be secured to the shaft 27 and an engaging dog 30' oppositely secured to the adjacent face of the clutch plate 29 for thus providing dog-type drive coupling therebetween.

The friction surface 28 of the clutch plate 29 engages an adjacent face of the sheave 26 for establishing a friction driving relationship therewith. The plate 29 is continuously biased toward the sheave 26 along the shaft 27 by a spring 31, which surrounds the shaft 27 with one end thereof engaging the plate 29 and the opposite end thereof engaging a threaded nut adjusting means 32. The adjusting nut 32 is disposed along a threaded portion 32' of the shaft 27 so as to compress the spring 31 in a predetermined and conventional manner in order to ensure that desired friction is established at the aforementioned friction driving surface 28 of the plate 29. The drive shaft 27 of the drive train is supported by a suitable arrangement of support members 22', at least one of which provides a bearing sleeve 33 to support the shaft near the center portion thereof. At one end of the shaft 27, opposite the drive motor 24, there is provided a supporting sleeve 34, FIG. 6, for receiving and supporting the end of the shaft 27 in a manner which permits an unobstructed rotation of the shaft 27 relative to the supporting sleeve 34.

The sleeve 34 has formed thereon a sheave abutting flange portion serving to secure it to one side and at the center of the sheave 26 by means of screws 35, which also extend through and secure a flanged portion of a flanged sleeve 35' set into a relieved center portion at the opposite side of sheave 26 so as to provide a center portion for the sheave 26 which permits the shaft 27 to extend co-axially through the sheave 26 and into the aforementioned sleeve 34. The sleeve 34 extends outwardly from the sheave 26 and is supported by a plain bearing surface 36 fixed relative to a support member 22' in order that the sleeve 34 may rotate with respect thereto for turning a potentiometer shaft 37 coupled thereto for driving the aforementioned single turn potentiometer 25. The shaft 37 may be coupled to the sleeve 34 by any convenient means, such as a spline, set-screw 38, or the like, which permits a ready disassembly of the device.

As aforementioned, the potentiometer 25 is of a conventional single turn type which, therefore, requires that the shaft 37 be limited to no more than a single turn of rotation. For controlling the rotation of the shaft 37, the drive motor 24 is connected with a power source through a main power supply circuit having a plurality of leads L, including leads for interconnecting a pair of microswitches $MS_1$ and $MS_2$. The switches $MS_1$ and $MS_2$ are arranged in series, FIG. 7, and are mounted in fixed relationship adjacent the sheave 26. The switches $MS_1$ and $MS_2$ are provided with cam followers 39 and 39', respectively, and are spring biased to a closed condition. The switches are caused to open through the cam followers 39 and 39' being forced to "ride up" on cams 41 and 41', which are adjustably spaced with respect to each other and are secured to an adjacent surface of the sheave 26 in an adjustable fashion. The cams 41 and 41' are caused to break the main power supply circuit to the drive motor 24 when a predetermined extent of rotation of the sheave 26 has occurred. Since the microswitches $MS_1$ and $MS_2$ are in series, it is understood that both of these switches must be "closed" in order for the drive motor 24 to operate in a continuous manner, and in the event either switch $MS_1$ or $MS_2$ is "opened" to break the circuit, the motor 24 will cease to drive the shaft 27 and, consequently, the film-strip drive unit 17 will thus be inactivated. Therefore, it is understood that the cams 41 and 41' serve to control the operation and period of activation of the drive unit 17. Any adjustment of the relative positions of the cams alters the unit's activation period.

Figure 7:
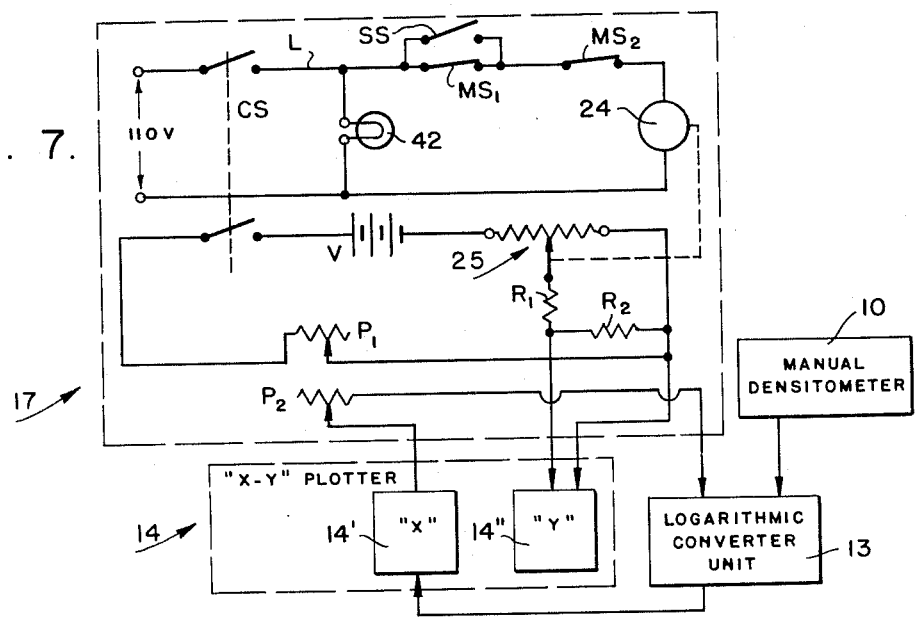
FIG. 7 is a diagrammatic view, in partial block form, of a control circuit utilized in the film-strip drive unit.

Referring more particularly to FIG. 7, the aforementioned main power supply circuit for the motor 24 may be connected with a 110 volt power source, while a 1½ volt D.C. (direct current) power source V serves as a power source for the potentiometer 25. A start switch SS is provided in the main power supply circuit to shunt, or by-pass, microswitch $MS_1$ so that when the switch $MS_1$ is in an opened condition, due to the positioning of the cam 41 beneath the follower 39, the circuit may be momentarily closed to complete the circuit for causing a rotation of the sheave 26 and thereby moving the cam 41 for thus allowing the cam follower 39 to be displaced for closing the switch $MS_1$. When the switch $MS_1$ is closed, the motor 24 will operate in a continuous manner until the power supply circuit is again broken, through the cam 41' being forced against the follower 39', at the completion of a desired extent of sheave rotation.

A master double-pole, single-throw control switch CS may be used to disconnect the drive motor 24 from its power source and to simultaneously disconnect the 1½ volt power source V from the potentiometer 25. The master control switch CS is manually opened or closed in accordance with the intended operation of the device, and the operative condition thereof may be indicated through an indicator light 42.

A pair of resistors $R_1$ and $R_2$ form an impedance matching network while a potentiometer $P_1$ serves to permit the voltage drop across the potentiometer 25 to be selectively varied in order to adjust, or balance, the voltage applied across the pen means 14", while a potentiometer $P_2$ serves to permit the voltage across the pen drive 14' to be varied in order to adjust for a proper drive of pen 15 across the surface of graph G. The operation of the circuit will hereinafter be more fully set forth in connection with a summarization of the operation of the device.

It has been found desirable to utilize a film-strip positioning control unit and guide assembly 45, FIGS. 4 and 5, for providing an initial adjustment for the draw line 18 of the unit 17 in order that each succeeding film-strip 12 may be properly positioned in a starting position with respect to a given densitometer 10. Adjustment is particularly important where the unit 17 is designed to be used as a permanent unit. The control unit 45 is mounted ahead of the reel assembly 23 so as to be disposed between the reel assembly 23 and the densitometer 10 and is so aligned with the sheave 26 that the draw line 18 passes therethrough as it is wound onto and drawn or "stripped" from the sheave 26.

The control unit 45, is supported by a pair of bearing surfaces 46 and 46', in the form of sleeves, arranged in spaced relation with respect to each other and maintained at a desired level by a pair of supports 22'. Disposed between the bearing supports is a pair of spaced plates 47 and 47' which serve to mount, therebetween, a pair of spaced bearing supported guide rolls 48 and 48', which guide the draw line 18 as it passes into and out of the unit 17. The plates 47 and 47' are supported by a pair of outwardly extending oppositely disposed shafts 49 and 49' fixedly secured at right angles to an adjacent plate, as by welding or the like, and are operatively supported through bearing sleeves 46 and 46'. The plates are supported in a manner such that as the shaft 49 is turned both of the plates 47 and 47' rotate while maintaining a fixed relationship with each other in a manner for angularly displacing the guide rolls 48 and 48' with respect to the support base 22, and consequently relative to the sheave 26. Where deemed desirable, a leaf-spring tension means 50 may be fixedly secured to one end of the shaft 49', by means such as a screw 50', to act as a brake on the shaft 49', and serves as a position retaining means for the plates 47 and 47', upon their rotated condition being effected. For turning the shaft 49, a rod 51, provided with a knob 51', extends through the bearing 46 and secured at one end to the shaft 49 through a suitable coupling having a set screw 52, so that a torque applied to the knob 51' causes the shaft 51 to rotate to thus angularly displace the guide rolls 48 and 48' against the positioning force of the spring 50 for thereby altering the path and changing the effective length of a draw line 18 passing the unit. An additional freely rotatable guide roll or sheave 53 may be provided adjacent the rolls 48 and 48' to guide the draw line as it passes into and out of the drive unit 17.

Therefore, it is understood that as the draw line 18 is drawn from sheave 26, it is caused to pass between the plates 47 and 47', partially around opposite sides of rolls 48 and 48' then partially around the sheave 53 and out of the unit 17 to a film-strip 12 located in guide track 16 adjacent the densitometer 10 where it is to be secured to a film-strip by the clip-like device 19. It is to be particularly noted that by angularly displacing the rolls 48 and 48', through turning the knob 51', the effective length of the draw line 18 may be varied in accordance with the extent of the angular displacement of the rolls 48 and 48' to thereby properly position the clip 19 relative to the densitometer 10, so that each successive pulling or "stripping" of the draw line 18 from the sheave 26 will position the clip 19 in the same position relative to the densitometer 10 until such time as it is deemed desirable to move the unit 17, or angularly displace the rolls 48 and 48' with respect to the sheave 26.

The operation of the present invention may be more clearly understood with reference being made particularly to FIGS. 7 and 8. It is to be understood that when the film drive unit 17 is to be used in an integrated combination, for example, with the disclosed densitometer 10, logarithmatic converter 13, and the "X—Y" plotter unit 14, the power circuit for the motor 24 is connected through conventional means, not shown, to the aforementioned power source. The master control switch CS is first manually closed to connect the motor 24 with the source through series switches CS, $MS_1$ and $MS_2$. The power circuit for the potentiometer 25 is simultaneously closed with the closing of the control switch CS. Leads from the densitometer 10 extend to the logarithmic converter unit 13, which is connected with the "X" directional or density value drive means 14' for the plotter pen 15, while leads from the potentiometer 25 are connected with the "Y" directional or step drive means 14" of the plotter pen 15. With the units 10, 13, 14 and 17 being thus interconnected, the mechanism is ready to receive a film-strip 12 for plotting a film-strip density curve C on a graph G positioned within the plotter unit 14.

Figure 2:
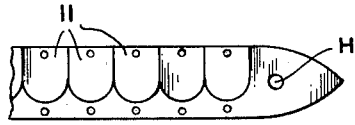
FIG. 2 is a fragmentary view of a portion of a film-strip utilized by the present invention.

For convenience, each film-strip is provided with a marking device, for example, a hole H, FIG. 2, for indicating a starting position for the film-strip 12 along the track 16 at the densitometer 10. The draw line 18 is manually drawn or "stripped" from the sheave 26 thus causing the sheave 26 to rotate against the friction surface 28, in a slipping manner, and positioning the cam 41 under the follower 39 of the microswitch $MS_1$ to cause the main power circuit to the drive motor 24 to be broken when the draw line is drawn "stripped" to a starting position for the film-strip.

In the event that the draw line 18 is not of a proper length to position an attached film-strip 12 in a proper starting position with respect to the densitometer 10, the film-strip control unit 45 is operated by turning knob 51' to angularly displace guide rolls 48 and 48' for altering the effective length of the draw line to thus properly position the hole H of the film strip relative to the densitometer 10. The plotting pen 15 is set by conventional means, not shown, relative to the graph G at an arbitrary point, indicated by the reference character O, on the face of the graph G. With the apparatus thus "set" and adjusted to operate in response to a signal voltage, the operator may manually close the start switch SS for by-passing switch $MS_1$ to cause drive motor 24 to rotate in order for the follower 39 to "drop" off cam 41 and thereby close the switch $MS_1$, whereupon the start switch SS may be released and allowed to open. The motor 24 is now continuously operated and serves to drive the reel assembly for winding the draw line about the sheave 26 and draw the steps 11 successively through the densitometer 10. Rotation of the sheave 26 serves to drive the potentiometer 25 for providing a drive signal to the "Y" directional, or step, drive means 14" of the "X—Y" plotter. A control signal is simultaneously directed from the densitometer 10, in accordance with a light beam passing through the film-strip to a photo responsive cell, FIG. 8, through the logarithmic converter unit 13, to the "X" directional, or density, drive means 14' of the plotter, to indicate and plot successive density values for each successive step 11 as determined by the densitometer 10. Since the sheave is operated in a continuous manner, the pen 15 of the plotter 14 is caused to continuously traverse the graph G, for all twenty one steps 11, under the dictates of the drive signals generated by the potentiometer 25 and the densitometer 10 to plot curve C until such time as the drive motor 24 is inactivated by the cam 41' acting against cam follower 39' to break the main power circuit thereby causing the plotting operation to cease. The film-strip 12 may now be removed from clip 19 and the graph G, having curve C plotted thereon, removed from the plotter unit 14. The device 17 may now be re-set and a new film-strip 12 prepared for plotting purposes in the above disclosed manner.

It is to be particularly noted, that when a film-strip 12 is removed from the clip 19 and the draw line 18 again "stripped" from the sheave 26, the microswitch $MS_2$ is closed, through the displacement of cam 41' from beneath the cam follower 39', the motor 24 is again activated since the power supply circuit is then completed. The felt friction surface 28 permits a necessary slipping to occur between the clutch plate 29 and sheave 26 for allowing the draw line 18 to be "stripped" from the sheave. In the event the draw line 18 is "stripped" from the sheave 26 only to the extent necessary for rotating the sheave sufficiently for positioning the cam 41 beneath the follower 39 of the switch MS₁, the power circuit for the drive motor 24 will be broken and the unit 17 accordingly will be inactivated. However, in practice such positioning of the cam 41 seldom occurs, since in most instances an excessive length of the draw line 18 is "stripped" or drawn by an operator from the sheave 26 and the cam 41 is angularly displaced beyond the follower 39. It is to be particularly noted, however, that since the motor 24 when activated serves for continuously driving the shaft 27 to rotate the clutch plate 29 for causing the sheave 26 to wind, or reel, in the draw line 18 when the draw line has been released after being manually "stripped" from the sheave. When the sheave 26 has been driven in a winding direction to an extent necessary for properly positioning the film-strip with respect to the densitometer, the cam 41 will be located beneath the follower 39 and the microswitch MS₁ will then break the main power circuit to thus inactivate the drive motor 24 leaving the film-strip 12 in a proper starting position relative to the densitometer 10.

In accordance with the above teachings, it is understood that there has been provided a film-strip drive unit which may be combined with a manual densitometer and an "X—Y" plotter, as well as a log converter where deemed desirable, to provide a unique combination for automating the heretofore tedious and time consuming task of manually plotting film-strip density curves. The drive unit performs a plurality of related functions in the combination, which includes automatically drawing the film-strip to be read through the densitometer, and simultaneously therewith, transmitting a signal to drive the plotting pen along an axis of the recorder unit to plot a density curve in conjunction with film-strip density value signals being directed to the plotter unit from the densitometer.

Obviously many modifications and variations of the present invention are possible in the light of the above teachings. It is therefore to be understood that within the scope of the appended claims the invention may be practiced otherwise than as specifically described.

What is claimed is:

1. A film-strip processing mechanism comprising in combination:

a support base;

a film-strip guide means disposed on said support base;

a film-strip densitometer mounted adjacent said guide means and arranged for having a film-strip drawn therethrough;

a film-strip drive means arranged adjacent said guide means for drawing a film-strip through said densitometer and along said guide means;

a plotting device having a voltage controlled plotting pen disposed therein;

means connected with said film-strip drive means for providing a control voltage to control the driving of said pen in one direction in accordance with the drawing of said film-strip along said guide means through said densitometer by said film-strip drive means; and means responsive to said densitometer for driving said pen laterally of said one direction.

2. The combination as defined in claim 1 further characterized in that said film-strip drive means comprises:

a rotatable sheave;

a power train for imparting rotation to said sheave;

a flexible draw-line secured at one end to said sheave having an effective length necessary for drawing a film-strip from an initial position relative to said densitometer and along said guide means; a film-strip attaching means arranged at an end of said draw line opposite said one end; and a linear potentiometer arranged adjacent said sheave and controlled in accordance with the rotation thereof, for providing said control voltage for said pen so that as the power train imparts rotation to said sheave for drawing said film-strip through said densitometer said plotting pen will be driven in accordance with said control voltage provided by said potentiometer.

3. The combination in accordance with claim 2 wherein means are provided to vary the effective length of said draw-line in accordance with displacement of said film drive means with respect to said densitometer.

4. The combination as defined in claim 2, further characterized in that said power train for controlling rotation of said sheave comprises:

a plurality of series switches so arranged adjacent said sheave as to be opened and closed in accordance with the rotation thereof; and a shunt switch for by-passing at least one of said series switches for initiating rotation of said sheave when said one of said series switches is in an opened condition.

5. The combination of claim 4 further characterized in that adjusting means comprising variable resisters are provided for imposing voltages of desired values on said voltage controlled pen drive means.

6. The combination of claim 1 further characterized in that said film-strip drive means includes:

a base;

a drive motor mounted on said base and adapted to be electrically activated;

a take-up reel assembly rotatably mounted adjacent said motor;

a power train including a spring biased slip-clutch for connecting said take-up reel assembly with said motor for rotatably driving the take-up reel assembly in response to motor activation;

a flexible film-strip draw line including means for attaching a film-strip thereto and means for securing the draw line to said take-up reel assembly in a manner such that as the take-up reel assembly is rotated in response to an activation of said motor the draw line is caused to wind about said reel assembly for displaceably drawing a draw line attached film-strip through said densitometer;

means including a potentiometer operatively connected with said take-up reel assembly and adapted to be driven thereby for providing output signals indicative of film-strip displacement.

7. The device as defined in claim 6 further characterized in that a plurality of electrical switch means are provided in operative association with said take-up reel assembly for dictating periods of motor activation.

8. The device as defined in claim 7 further characterized in that said potentiometer comprises a single turn linear potentiometer.

9. The combination as defined in claim 1 further characterized in that said film-strip drive means includes:

a housing;

a film-strip draw line for displaceably drawing a film-strip along said guide means;

a rotatably mounted take-up reel arranged within said housing and connected with said draw line for winding said draw line thereabout;

a power source connected with the take-up reel for rotatably driving said take-up reel to wind said draw line thereabout;

a slip-clutch interposed between said power source and said take-up reel to permit the take-up reel adapted to be rotated in opposition to said power source;

a plurality of power control switches connected with said power source and adapted to impose an operative control thereon;

a plurality of cam elements fixed to a given surface of said reel and adapted to selectively actuate said switches as the reel is rotated to thus effectively dictate rotation of said take-up reel and thereby limit displacement of said draw line as it wound about said reel; and a signal generating means coupled in driving relationship with said take-up reel and adapted to provide output signals having voltage values commensurate with imparted draw line displacement.

10. The combination of claim 9 further including an adjusting means for adjusting the effective length of said draw line.

11. The combination of claim 10 wherein the adjusting means comprises a plurality of movable guide rollers mounted for simultaneous displacement relative to said take-up reel.

References Cited in the file of this patent
UNITED STATES PATENTS
2,912,673    Groenendyke ---------- Nov. 10, 1959